(12) United States Patent
Kanou

(10) Patent No.: US 10,337,109 B2
(45) Date of Patent: Jul. 2, 2019

(54) HIGH PURITY COBALT CHLORIDE AND MANUFACTURING METHOD THEREFOR

(71) Applicant: JX Nippon Mining & Metals Corporation, Tokyo (JP)

(72) Inventor: Gaku Kanou, Ibaraki (JP)

(73) Assignee: JX NIPPON MINIG & METALS CORPORATION, Tokyo (JP)

( * ) Notice: Subject to any disclaimer, the term of this patent is extended or adjusted under 35 U.S.C. 154(b) by 328 days.

(21) Appl. No.: 14/906,774

(22) PCT Filed: Sep. 5, 2014

(86) PCT No.: PCT/JP2014/073479
§ 371 (c)(1),
(2) Date: Jan. 21, 2016

(87) PCT Pub. No.: WO2015/083406
PCT Pub. Date: Jun. 11, 2015

(65) Prior Publication Data
US 2016/0168728 A1 Jun. 16, 2016

(30) Foreign Application Priority Data
Dec. 2, 2013 (JP) .................................. 2013-249184

(51) Int. Cl.
*C25B 1/26* (2006.01)
*C01G 51/08* (2006.01)
(Continued)

(52) U.S. Cl.
CPC .............. *C25B 1/26* (2013.01); *C01G 51/085* (2013.01); *C25B 9/08* (2013.01); *C25B 11/04* (2013.01); *C01P 2006/80* (2013.01)

(58) Field of Classification Search
CPC .. C25B 1/26; C25B 9/08; C25B 11/04; C01G 51/085; C01P 2006/80
See application file for complete search history.

(56) References Cited

U.S. PATENT DOCUMENTS 4,514,372 A * 4/1985 Devuyst ............... C01G 51/085
423/150.1
5,667,665 A 9/1997 Shindo et al.
(Continued)

FOREIGN PATENT DOCUMENTS

JP    S55-158280 A    12/1980
JP    H01-275436 A    11/1989
(Continued)

OTHER PUBLICATIONS

MSDS No. C4928. Cobalt Chloride. Dec. 8, 1996. (Year: 1996).*

*Primary Examiner* — Ciel P Thomas
(74) *Attorney, Agent, or Firm* — Howson & Howson LLP

(57) ABSTRACT

Provided is high purity cobalt chloride having a purity of 5N (99.999%) or higher, and a manufacturing method of the high purity cobalt chloride via electrolysis, wherein cobalt having a purity of 5N or higher is used as an anode, a diluted hydrochloric acid bath having a pH of 1.5 to 3.0 is used as an electrolytic solution, the cobalt anode and a cathode plate are partitioned with an anion exchange membrane, and electrodeposition of the cobalt onto the cathode plate is thereby inhibited. An object of this invention is to provide a manufacturing method capable of providing high purity cobalt chloride at a higher purity and at a lower production cost than conventional methods. Under circumstances where demands for cobalt chloride may increase, cobalt chloride needs to be manufactured at high volume and at low cost, and the present invention offers a technique capable of satisfying the foregoing requirements.

13 Claims, 1 Drawing Sheet

(51) Int. Cl.
  *C25B 11/04* (2006.01)
  *C25B 9/08* (2006.01)

(56) References Cited

U.S. PATENT DOCUMENTS

| | | |
|---|---|---|
| 6,740,290 B2 | 5/2004 | Uchikoshi et al. |
| 6,818,119 B2 | 11/2004 | Wang et al. |
| 6,896,788 B2 | 5/2005 | Shindo et al. |
| 2002/0117025 A1* | 8/2002 | Uchikoshi ........... C22B 23/0423 75/626 |
| 2009/0098012 A1 | 4/2009 | Shindo et al. |
| 2013/0028786 A1 | 1/2013 | Kanou |
| 2014/0010705 A1 | 1/2014 | Kanou |
| 2014/0332404 A1 | 11/2014 | Shindo et al. |

FOREIGN PATENT DOCUMENTS

| | | |
|---|---|---|
| JP | 2001-020021 A | 1/2001 |
| JP | 2006-193821 A | 7/2006 |
| JP | 2012-255188 A | 12/2012 |

* cited by examiner

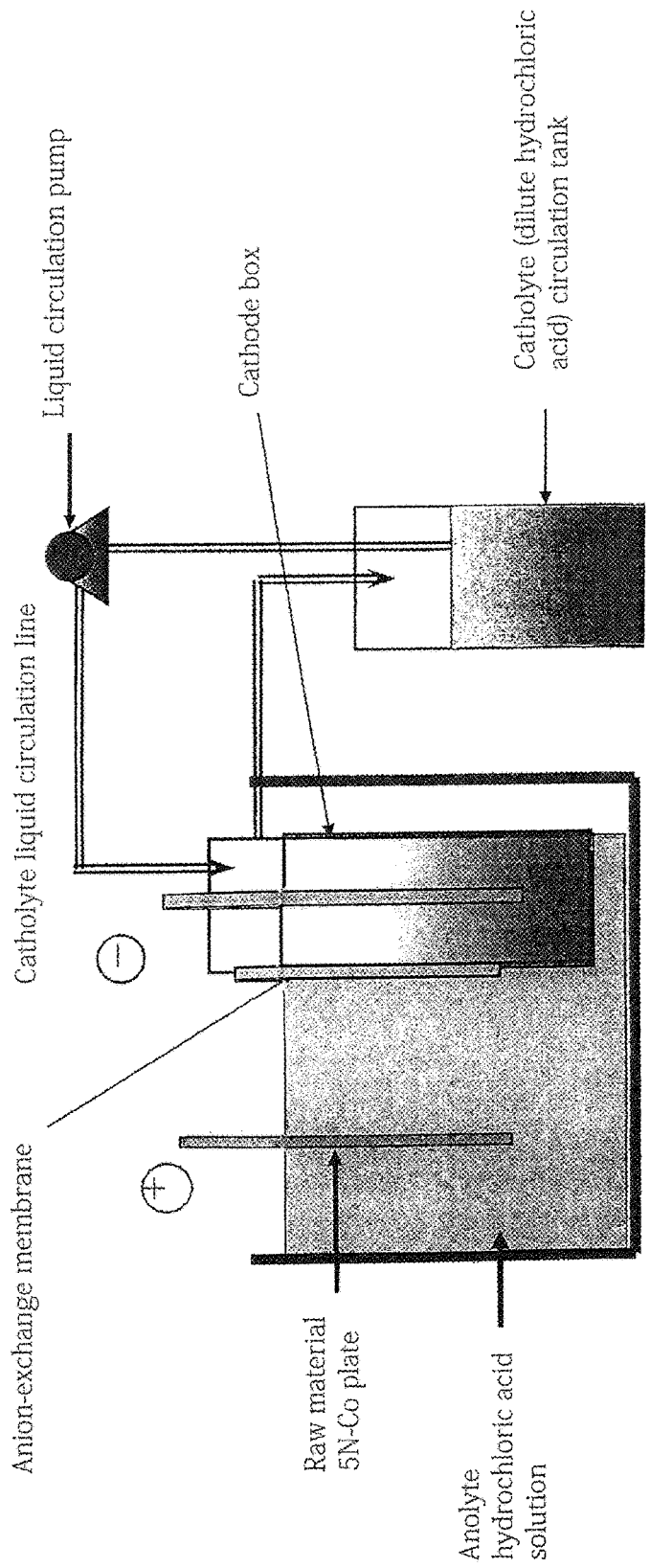

HIGH PURITY COBALT CHLORIDE AND MANUFACTURING METHOD THEREFOR

BACKGROUND

The present invention relates to high purity cobalt chloride that is useful as a precursor of CVD materials for producing semiconductor devices and has a higher purity than conventionally by using and electrolyzing cobalt having a purity that can be used as the raw material of cobalt chloride, as well as to the manufacturing method of such high purity cobalt chloride.

Conventionally, cobalt chloride has been used as the raw material of catalysts, organic pigments, dry-wet indicators, magnetic materials and the like. All of these items are demanded of high purity cobalt chloride.

For example, when producing high purity cobalt powder by reducing hydrogen from cobalt chloride, and using the obtained high purity cobalt powder as a magnetic material target, elimination of the following impurities is required.

(1) Alkali metals such as Na (sodium) and K (potassium), and alkaline-earth metals such as Ca (calcium)

(2) Gas components such as C (carbon) and O (oxygen)

(3) S (sulfur)

The impurities described in (1) to (3) entail the following problems.

Since alkali metals such as Na and K and alkaline-earth metals such as Ca easily migrate within the insulating film, they cause the deterioration in the insulation resistance.

Gas components such as C and O cause the generation of particles during sputtering.

S causes the deterioration in the material strength of the target and becomes the source of corrosion of the target.

As an example of a manufacturing method of cobalt chloride, there is Patent Document 1 below. Patent Document 1 describes a manufacturing method of cobalt chloride of using cobalt having a favorable purity level as the anode, using a diluted hydrochloric acid aqueous solution as the electrolytic solution, and electrolytically dissolving the cobalt anode at an acid concentration of 5N (normality) to pH of 1, cathode current density of 5 A/dm$^2$ or less, while maintaining the temperature to be 60° C. or less.

Nevertheless, Patent Document 1 has a problem in that cobalt becomes electrodeposited onto the cathode plate, and this may result in the deterioration of the production efficiency. Moreover, the achieved high purity level is 2N5 (99.5 wt %), and there is no choice but to say that the high purity level is low.

PRIOR ART DOCUMENTS

Patent Documents

Patent Document 1: Japanese Examined Patent Application Publication No. S61-7473

SUMMARY

An object of this invention is to manufacture high purity cobalt chloride at a higher purity and at a lower production cost than conventional methods. Moreover, under circumstances where demands for cobalt chloride may increase, cobalt chloride needs to be manufactured at high volume and at low cost, and the present invention offers a technique capable of satisfying the foregoing requirements.

In light of the above, the present application provides the following invention:

(1) A manufacturing method of high purity cobalt chloride via electrolysis, wherein cobalt having a purity of 5N (99.999%) or higher excluding gas components of oxygen (O), carbon (C), nitrogen (N), hydrogen (H), sulfur (S), and phosphorus (P) is used as an anode, a diluted hydrochloric acid bath having a pH of 1.5 to 3.0 is used as an electrolytic solution, the cobalt anode and a cathode plate are partitioned with an anion exchange membrane, and electrodeposition of the cobalt onto the cathode plate is thereby inhibited.

The present application additionally provides the following invention.

(2) The manufacturing method of high purity cobalt chloride via electrolysis according to (1) above, wherein the cobalt, and chlorine in the electrolytic solution, are subject to electrosynthesis, and, since the diluted hydrochloric acid concentration decreases during progress of the electrosynthesis reaction, so as to adjust the decreased diluted hydrochloric acid concentration and to attain a pH value of 1.5 to 3.0, a new diluted hydrochloric acid solution is added to an electrolytic bath for use in the electrosynthesis; otherwise, a catholyte circulation tank is provided separately from the electrolytic bath for use in the electrosynthesis, a new diluted hydrochloric acid solution is filled in the catholyte circulation tank and circulated and supplied to the electrolytic bath so as to perform the electrosynthesis while adjusting the diluted hydrochloric acid concentration in the electrolytic solution and managing the pH value.

(3) The manufacturing method of high purity cobalt chloride via electrolysis according to (1) or (2) above, wherein a Ti plate is used as the cathode plate.

(4) The manufacturing method of high purity cobalt chloride via electrolysis according to any one of (1) to (3) above, wherein the thus prepared cobalt chloride solution is evaporated to dryness and concentrated, thereafter removed through suction, filtered and separated, and the filtered cobalt chloride is subsequently dried.

(5) The manufacturing method of high purity cobalt chloride via electrolysis according to (4) above, wherein, upon evaporating the cobalt chloride solution to dryness, the evaporation to dryness process is ended at the time that the weight of the cobalt chloride solution reaches 80 to 95% of the weight before evaporation to dryness, the concentrated cobalt chloride solution is removed through suction, filtered and separated, and the filtered cobalt chloride is subsequently dried.

The present application additionally provides the following invention.

(6) High purity cobalt chloride, wherein content of impurity elements of Na, Cd, Cu, Cr, Fe, In, Mg, Mn, Ni, Pb, Sn, Ti, Tl, and Zn is each 1 ppm or less.

(7) The high purity cobalt chloride according to (6) above, wherein purity of the high purity cobalt chloride is 5N or higher.

(8) The high purity cobalt chloride according to (6) or (7) above, wherein the high purity cobalt chloride is manufacturing with the manufacturing method according to any one of (1) to (5) above.

Incidentally, the indication of the unit of "ppm" used in the present invention refers to "wtppm", the analysis of impurities in the present invention was performed using the ICP-MS (Inductively Coupled Plasma-Mass Spectrometry) method, and the detection limit in the analysis of chlorides is 1 wtppm.

The present invention yields an effect of being able to provide a manufacturing method capable of manufacturing high purity cobalt chloride which is useful as a precursor of semiconductor CVD materials without waste and at a reduced manufacturing cost. The electrolysis employed in the manufacturing method of the present invention enables a production yield of 95% or higher. Under circumstances where demands for cobalt chloride as the raw material of a precursor of semiconductor CVD materials may increase, cobalt chloride needs to be manufactured at high volume and at low cost, and the present invention offers a technique capable of satisfying the foregoing requirements.

BRIEF DESCRIPTION OF THE DRAWINGS

FIG. 1 is an explanatory diagram of the electrolytic bath that is used in the manufacture of the high purity cobalt chloride of the present invention.

DETAILED DESCRIPTION

The manufacturing method of the high purity cobalt chloride via electrolysis of the present invention uses, as the anode, cobalt having a purity of 5N or higher excluding the gas components of O, C, N, H, S, and P. As a result of using cobalt having a purity of 5N or higher, it is possible to manufacture high purity cobalt chloride, and in particular it is possible to achieve a purity level that can be used as CVD materials for manufacturing semiconductors. When cobalt having a purity of less than 5N is used, there is a problem in the purity as a semiconductor material, and in particular when there are residual components such as Na, K, and Fe, the cobalt cannot be used as the semiconductor material.

A hydrochloric acid bath having a pH of 1.5 to 3.0 is used as the electrolytic solution. By using a hydrochloric acid bath, it is possible to easily manufacture cobalt chloride that is useful as a precursor of semiconductor CVD materials. Moreover, the reason why pH is set to be within a range of 1.5 to 3.0 is because, when hydrochloric acid and cobalt are subject to electrosynthesis via electrolysis, the cobalt anode can be easily dissolved in the hydrochloric acid bath, the inclusion of impurities can be inhibited, and the generation of chlorine gas can be inhibited.

When the pH is less than 1.5, this is undesirable since the acid concentration becomes high, the impurities containing the 5N cobalt anode tend to become dissolved in the electrolytic solution, the purity of the cobalt chloride manufactured in the present invention will decrease, and chlorine gas tends to become generated.

Moreover, when the pH exceeds 3.0, this is undesirable since oxides and hydroxides are easily generated and form suspended matter in the electrolytic solution, and the production volume will decrease due to the deterioration in the solubility of cobalt.

In particular, Patent Document 1 (Japanese Examined Patent Application Publication No. S61-7473) as conventional technology describes a manufacturing example of cobalt chloride via electrolysis by using cobalt having a favorable purity level as the anode, using a diluted hydrochloric acid aqueous solution as the electrolytic solution, and electrolytically dissolving the cobalt anode at an acid concentration of 5N (normality; pH −0.7) to pH 1.0, which is a higher acid concentration range than the present invention. Nevertheless, Patent Document 1 is increasing its acid concentration in order to prevent the electrodeposition of cobalt onto the cathode plate, which in turn increases the amount of dissolution of impurities in the electrolytic solution. Thus, the purity of the cobalt chloride manufactured in Patent Document 1 is 2N5 (99.5 wt %), and Patent Document 1 is unable to obtain the high purity cobalt chloride that can be obtained in the present invention.

Moreover, since it is an essential condition of Patent Document 1 to prevent the electrodeposition of cobalt onto the cathode plate, the pH cannot be set to be greater than 1.0.

A major feature of the present invention is that the cobalt anode and the cathode plate are partitioned with an anion exchange membrane. Based on this anion exchange membrane, it is possible to inhibit positive ion cobalt which became eluted into the hydrochloric acid bath from the cobalt anode plate from becoming electrodeposited onto the cathode plate. Accordingly, since it is not necessary to considerably increase the acid concentration of the electrolytic solution, it is possible to inhibit the inclusion of impurities from the cobalt anode, manufacture high purity cobalt chloride, and inhibit the generation of chlorine gas. Consequently, the durability of the device can be improved, and the safety of the workplace can also be improved.

In addition, it is possible to inhibit the increased costs for the cleansing that is required after the electrolysis. Moreover, it is also possible to improve the production efficiency of cobalt chloride by that much. As the hydrochloric acid that is used as the electrolytic solution, electronics industrial grade (EL grade) diluted hydrochloric acid is desirably used. This is in order to deal with the high purification process required for manufacturing cobalt chloride as a precursor of CVD materials for producing semiconductors.

In the course of manufacturing the high purity cobalt chloride via electrolysis as described above, the cobalt, and chlorine in the electrolytic solution, are subject to electrosynthesis, and, since the diluted hydrochloric acid concentration decreases during progress of the electrosynthesis reaction, so as to adjust the decreased diluted hydrochloric acid concentration and to attain a prescribed pH value (1.5 to 3.0), a new diluted hydrochloric acid solution may be added to an electrolytic bath for use in the electrosynthesis. Otherwise, a catholyte circulation tank may be provided separately from the electrolytic bath for use in the electrosynthesis, a new diluted hydrochloric acid solution may be filled in the catholyte circulation tank and circulated and supplied to the electrolytic bath. It is thereby possible to perform the electrosynthesis while adjusting the diluted hydrochloric acid concentration in the electrolytic solution as needed and managing the pH value.

Subsequently, the thus prepared cobalt chloride solution is evaporated to dryness and concentrated, thereafter removed, filtered and separated, and the filtered cobalt chloride is subsequently dried in order to obtain high purity cobalt chloride.

In the foregoing case, upon evaporating the cobalt chloride solution to dryness, the evaporation to dryness process is ended at the time that the weight of the cobalt chloride solution reaches 80 to 95% of the weight before evaporation to dryness, the concentrated cobalt chloride solution in the state is removed, filtered and separated so as to eliminate the impurities contained in the cobalt chloride solution to the filtrate side, and the filtered cobalt chloride is subsequently dried. This process is effective for high purification, and also effective in terms of production efficiency.

Based on the manufacturing method of cobalt chloride described above, it is possible to obtain high purity cobalt chloride in which the content of the impurity elements of Na, Cd, Cu, Cr, Fe, In, Mg, Mn, Ni, Pb, Sn, Ti, Tl, and Zn is each 1 ppm or less. This is a major feature of the present invention. It is thereby possible to obtain high purity cobalt chloride having a purity of 5N or higher excluding the gas components of O, C, N, H, S, and P.

Desirably, a Ti plate is used as the cathode plate. This is because Ti possesses corrosion resistance properties, and it is effective for preventing contamination from the Ti of the Ti plate or from the impurities contained in the Ti plate. A carbon plate or a cobalt plate may also be used as the cathode plate material.

EXAMPLES

The Examples and Comparative Examples of the present invention are now explained. These Examples and Comparative Examples are provided for facilitating the understanding of the subject matter of the present invention, and this invention is not in any way limited thereby.

Example 1

An example of refining cobalt chloride using the electrolytic bath shown in FIG. 1 is now explained. The capacity of the electrolytic bath is 100 L. An anion exchange membrane was placed at the center of the electrolytic bath to partition the electrolytic bath into two sections. 5N cobalt was used as the anode on the left side of FIG. 1.

While there is no limitation in the manufacturing method of cobalt so as long as the purity of cobalt is 5N or higher, in the present invention, cobalt is subject to electrolytic refining and electrowinning, and the high purity cobalt that underwent solvent extraction is used as the anode, and the purity of cobalt is purity excluding the gas components of O, C, N, H, S, and P.

Moreover, in the case of the electrolysis performed in the present invention, the cobalt, and chlorine in the electrolytic solution, were subject to electrosynthesis, and, so as to adjust the diluted hydrochloric acid concentration which decreases during progress of the electrosynthesis reaction, a new diluted hydrochloric acid solution was filled in a catholyte circulation tank provided separately from the electrolytic bath for use in the electrosynthesis and circulated and supplied to the electrolytic bath, and the electrosynthesis of the cobalt chloride was performed while adjusting a pH value of the electrolytic solution.

A diluted hydrochloric acid was used as the electrolytic solution, and the cobalt chloride concentration in the initial electrolytic solution (aqueous solution) was 0 g/L, pH was 1.5, and current density was 1.0 A/dm$^2$ upon performing electrodissolution. The initial temperature of the electrolytic solution was 25° C.

The cobalt anode became dissolved during the electrolysis and became a cobalt chloride solution, and the concentration of the cobalt chloride gradually increased. Twenty-four hours were required from the start of electrolysis to the end of electrolysis. It was thereby possible to obtain a concentrated cobalt chloride solution.

The titanium plate that was used as the cathode plate did not show any precipitation of cobalt, and it was confirmed that the cathode plate used in this Example could be used in the subsequent electrolysis. Moreover, the production yield based on this electrolysis was 99%.

The cobalt chloride solution prepared via electrolysis as described above was additionally evaporated to dryness and concentrated, the evaporation to dryness process was ended at the time that the weight of the cobalt chloride solution reached 95% of the weight before evaporation to dryness, the concentrated cobalt chloride solution was removed through suction, filtered and separated to remove the impurities to the filtrate side, and the filtered cobalt chloride was subsequently dried to prepare cobalt chloride.

As a result of analyzing the obtained cobalt chloride via the ICP-MS (Inductively Coupled Plasma-Mass Spectrometry) method, the content of the impurity elements of Na, Cd, Cu, Cr, Fe, In, Mg, Mn, Ni, Pb, Sn, Ti, Tl, and Zn was each 1 ppm or less, and it was possible to obtain a favorable, concentrated, high purity cobalt chloride solution.

The thus prepared cobalt chloride was able to maintain the purity of the cobalt anode material used as the raw material, and it was possible to obtain high purity cobalt chloride having a purity of 5N6 (99.9996%) excluding the gas components of O, C, N, H, S, and P.

Example 2

A diluted hydrochloric acid was used as the electrolytic solution in the same manner as Example 1, and the cobalt chloride concentration in the initial electrolytic solution (aqueous solution) was 0 g/L, pH was 3.0, and current density was 1.0 A/dm$^2$, and the initial temperature of the electrolytic solution was 25° C. upon performing electrosynthesis.

The cobalt chloride solution that underwent electrosynthesis was removed and filled in a crucible for use in evaporation to dryness, and subject to evaporation to dryness. In the foregoing case, the evaporation to dryness process was ended at the time that the weight of the cobalt chloride solution reached 80% of the weight before evaporation to dryness, the concentrated cobalt chloride solution was removed through suction, filtered and separated to remove the impurities to the filtrate side, and the filtered cobalt chloride was subsequently dried to prepare cobalt chloride. The remaining conditions were the same as the conditions of Example 1.

As a result of analyzing the obtained cobalt chloride, the content of the impurity elements of Na, Cd, Cu, Cr, Fe, In, Mg, Mn, Ni, Pb, Sn, Ti, Tl, and Zn was each 1 ppm or less, and it was possible to obtain high purity cobalt chloride having a purity of 5N3 (99.9993%) excluding the gas components of O, C, N, H, S, and P.

Comparative Example 1

The Comparative Example is now explained. As the electrolytic solution to be used in electrolysis, electrolytic solution was used in the same manner as Example 1. In this case, an anion exchange membrane was not used.

As the electrolysis conditions, the cobalt chloride concentration in the initial electrolytic solution (aqueous solution) was 0 g/L, pH was 3.0, and current density was 1.0 A/dm$^2$, and the initial temperature of the electrolytic solution was 25° C. upon performing electrodissolution.

As a result, cobalt that was electrolyzed from the anode became electrodeposited onto the titanium electrode as the cathode plate, and it was not possible to obtain cobalt chloride. Moreover, since electrolysis was performed in which the pH value was a relatively high value of 3, it was easy for suspended matter such as oxides or hydroxides become generated in the electrolytic solution, and there was also a problem in that the purity of the cobalt itself becomes deteriorated.

The present invention yields an effect of being able to provide a manufacturing method capable of manufacturing high purity cobalt chloride which is useful as a precursor of semiconductor CVD materials without waste and at a reduced manufacturing cost. The electrolysis employed in the manufacturing method of the present invention enables a production yield of 95% or higher. Under circumstances where demands for cobalt chloride as the raw material of a precursor of semiconductor CVD materials may increase, cobalt chloride needs to be manufactured at high volume and at low cost, and the present invention offers a technique capable of satisfying the foregoing requirements.

The invention claimed is:

1. A manufacturing method of high purity cobalt chloride having a purity of 5N or higher, excluding gas components of O, C, N, H, S, and P, and a content of Tl as an impurity element of 1 ppm or less via electrolysis, wherein cobalt having a purity of 5N (99.999%) or higher excluding gas components of O, C, N, H, S, and P is used as an anode, a diluted hydrochloric acid bath having a pH of 1.5 to 3.0 is used as an electrolytic solution, the cobalt anode and a cathode plate are partitioned with an anion exchange membrane, cobalt is eluted from the cobalt anode into the diluted hydrochloric acid bath during the electrolysis, and electrodeposition of the cobalt in the hydrochloric acid bath onto the cathode plate is thereby inhibited by the anion exchange membrane.

2. The manufacturing method of high purity cobalt chloride via electrolysis according to claim 1, wherein the cobalt, and chlorine in the electrolytic solution, are subject to electrosynthesis, and so as to adjust a concentration of diluted hydrochloric acid within the electrolytic solution, which decreases during progress of the electrosynthesis, a new diluted hydrochloric acid solution is added to the electrolytic solution for use in the electrosynthesis, or a catholyte circulation tank is provided separately from the electrolytic solution for use in the electrosynthesis, a new diluted hydrochloric acid solution is filled in the catholyte circulation tank and circulated and supplied to the electrolytic solution, and the electrosynthesis is performed while adjusting a pH value of the electrolytic solution to 1.5 to 3.0.

3. The manufacturing method of high purity cobalt chloride via electrolysis according to claim 2, wherein a Ti plate is used as the cathode plate.

4. The manufacturing method of high purity cobalt chloride via electrolysis according to claim 3, wherein a cobalt chloride solution is produced by the electrosynthesis, the cobalt chloride solution is evaporated to produce a concentrated cobalt chloride solution, and thereafter the concentrated cobalt chloride solution is removed, filtered and separated to produce cobalt chloride which is subsequently dried.

5. The manufacturing method of high purity cobalt chloride via electrolysis according to claim 4, wherein, upon evaporating the cobalt chloride solution to produce the concentrated cobalt chloride solution, evaporation of the cobalt chloride solution is ended when a weight of the cobalt chloride solution reaches 80 to 95% of a weight of the cobalt chloride solution at a start of the evaporation.

6. The manufacturing method of high purity cobalt chloride via electrolysis according to claim 2, wherein a cobalt chloride solution is produced by the electrosynthesis, the cobalt chloride solution is evaporated to produce a concentrated cobalt chloride solution, and thereafter the concentrated cobalt chloride solution is removed, filtered and separated to produce cobalt chloride which is subsequently dried.

7. The manufacturing method of high purity cobalt chloride via electrolysis according to claim 6, wherein, upon evaporating the cobalt chloride solution to produce the concentrated cobalt chloride solution, evaporation of the cobalt chloride solution is ended when a weight of the cobalt chloride solution reaches 80 to 95% of a weight of the cobalt chloride solution at a start of the evaporation.

8. The manufacturing method of high purity cobalt chloride via electrolysis according to claim 1, wherein a Ti plate is used as the cathode plate.

9. The manufacturing method of high purity cobalt chloride via electrolysis according to claim 8, wherein a cobalt chloride solution is produced in the electrolytic solution by electrosynthesis, the cobalt chloride solution is evaporated to produce a concentrated cobalt chloride solution, and thereafter the concentrated cobalt chloride solution is removed, filtered and separated to produce cobalt chloride which is subsequently dried.

10. The manufacturing method of high purity cobalt chloride via electrolysis according to claim 9, wherein, upon evaporating the cobalt chloride solution to produce the concentrated cobalt chloride solution, evaporation of the cobalt chloride solution is ended when a weight of the cobalt chloride solution reaches 80 to 95% of a weight of the cobalt chloride solution at a start of the evaporation.

11. The manufacturing method of high purity cobalt chloride via electrolysis according to claim 1, wherein a cobalt chloride solution is produced in the electrolytic solution by electrosynthesis, the cobalt chloride solution is evaporated to produce a concentrated cobalt chloride solution, and thereafter the concentrated cobalt chloride solution is removed, filtered and separated to produce cobalt chloride which is subsequently dried.

12. The manufacturing method of high purity cobalt chloride via electrolysis according to claim 11, wherein, upon evaporating the cobalt chloride solution to produce the concentrated cobalt chloride solution, evaporation of the cobalt chloride solution is ended when a weight of the cobalt chloride solution reaches 80 to 95% of a weight of the cobalt chloride solution at a start of the evaporation.

13. High purity cobalt chloride, wherein purity of the high purity cobalt chloride is 5N or higher excluding gas components of O, C, N, H, S, and P, and content of Tl as an impurity element is 1 ppm or less.

* * * * *